US008458366B2

(12) United States Patent
Belgaied et al.

(10) Patent No.: US 8,458,366 B2
(45) Date of Patent: Jun. 4, 2013

(54) METHOD AND SYSTEM FOR ONLOADING NETWORK SERVICES

(75) Inventors: Kais Belgaied, Sunnyvale, CA (US); Darrin P. Johnson, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1272 days.

(21) Appl. No.: 11/863,039

(22) Filed: Sep. 27, 2007

(65) Prior Publication Data

US 2009/0089351 A1    Apr. 2, 2009

(51) Int. Cl.
G06F 15/16  (2006.01)
G06F 15/173 (2006.01)

(52) U.S. Cl.
USPC .......................................... 709/250; 709/224

(58) Field of Classification Search
USPC ... 709/250, 200; 370/254; 710/316; 711/132; 714/758; 726/22
See application file for complete search history.

(56) References Cited

U.S. PATENT DOCUMENTS

| 6,041,053 | A  | * | 3/2000  | Douceur et al. ............. 370/389 |
| 6,070,219 | A  |   | 5/2000  | McAlpine et al. |
| 6,163,539 | A  |   | 12/2000 | Alexander et al. |
| 6,477,643 | B1 |   | 11/2002 | Vorbach et al. |
| 6,600,721 | B2 |   | 7/2003  | Edholm |
| 6,714,960 | B1 |   | 3/2004  | Bitar et al. |
| 6,757,731 | B1 |   | 6/2004  | Barnes et al. |
| 6,831,893 | B1 |   | 12/2004 | Ben Nun et al. |
| 6,859,841 | B2 |   | 2/2005  | Narad et al. |
| 6,944,168 | B2 |   | 9/2005  | Paatela et al. |
| 7,046,665 | B1 |   | 5/2006  | Walrand et al. |
| 7,177,311 | B1 |   | 2/2007  | Hussain et al. |
| 7,260,102 | B2 |   | 8/2007  | Mehrvar et al. |
| 7,313,142 | B2 |   | 12/2007 | Matsuo et al. |
| 7,334,178 | B1 | * | 2/2008  | Aulagnier ..................... 714/758 |
| 7,502,884 | B1 | * | 3/2009  | Shah et al. .................... 710/316 |
| 7,561,531 | B2 | * | 7/2009  | Lewites et al. ................ 370/254 |
| 7,965,714 | B2 | * | 6/2011  | Tripathi et al. ............... 370/392 |
| 2003/0037154 | A1 |   | 2/2003  | Poggio et al. |
| 2004/0034743 | A1 | * | 2/2004  | Wolrich et al. ............... 711/132 |
| 2004/0267866 | A1 | * | 12/2004 | Carollo et al. ................ 709/200 |
| 2005/0111455 | A1 |   | 5/2005  | Nozue et al. |
| 2005/0135243 | A1 |   | 6/2005  | Lee et al. |

(Continued)

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

*Primary Examiner* — Aaron Strange
(74) *Attorney, Agent, or Firm* — Osha • Liang LLP

(57) ABSTRACT

In general, the invention relates to a method for processing packets. The method includes receiving a first packet by a network interface card (NIC) connected to a host, classifying the first packet using a classifier, sending the first packet to a receive ring based on a classification of the first packet by the classifier, and sending the first packet from the receive ring to a first virtual network interface card (VNIC) located on the host. The method further includes determining, using a first policy associated with the first VNIC, whether to process the first packet using offload hardware. When the first packet is to be processed using the offload hardware, the method includes sending the first packet to the offload hardware, receiving a first processed packet from the offload hardware by the first VNIC and sending the first processed packet from the first VNIC to a first packet destination.

13 Claims, 7 Drawing Sheets

U.S. PATENT DOCUMENTS

| | | |
|---|---|---|
| 2005/0138620 A1 | 6/2005 | Lewites |
| 2006/0041667 A1 | 2/2006 | Ahn et al. |
| 2006/0045089 A1* | 3/2006 | Bacher et al. ............... 370/392 |
| 2006/0070066 A1 | 3/2006 | Grobman |
| 2006/0174324 A1 | 8/2006 | Zur et al. |
| 2008/0163370 A1* | 7/2008 | Maynard ........................ 726/22 |
| 2008/0270599 A1* | 10/2008 | Tamir et al. ................. 709/224 |

OTHER PUBLICATIONS

Tripathi, S.; "CrossBow: Network Virtualization and Resource Control"; presented at Sun Labs Open House, Jun. 1, 2006; 24 pages.

Tripathi, S.; "CrossBow: Network Virtualization and Resource Control"; presented at the SVOSUG meeting, Aug. 24, 2006; 27 pages.

* cited by examiner

METHOD AND SYSTEM FOR ONLOADING NETWORK SERVICES

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Low Impact Network Debugging" with U.S. application Ser. No. 11/489,926; "Reflecting Bandwidth and Priority in Network Attached Storage I/O" with U.S. application Ser. No. 11/489,936; "Priority and Bandwidth Specification at Mount Time of NAS Device Volume" with U.S. application Ser. No. 11/489,934; "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No. 11/489,923; and "Shared and Separate Network Stack Instances" with U.S. application Ser. No. 11/489,933.

The present application contains subject matter that may be related to the subject matter in the following U.S. applications filed on Nov. 28, 2006, and assigned to the assignee of the present application: "Virtual Network Testing and Deployment using Network Stack Instances and Containers" with U.S. application Ser. No. 11/605,114 and "Method and System for Creating A Demilitarized Zone using Network Stack Instances" with U.S. application Ser. No. 11/642,427 filed on Dec. 20, 2006.

The present application contains subject matter that may be related to the subject matter in the following U.S. application filed on Dec. 20, 2006, and assigned to the assignee of the present application: "Network Stack Instance Architecture with Selection of Transport Layers" with U.S. application Ser. No. 11/642,490; "Method and System for Virtual Routing Using Containers" with U.S. application Ser. No. 11/642,756.

The present application contains subject matter that may be related to the subject matter in the following U.S. applications filed on Mar. 30, 2007, and assigned to the assignee of the present application: "Method and System for Security Protocol Partitioning and Virtualization" with U.S. application Ser. No. 11/731,601; "Method and System for Inheritance of Network Interface Card Capabilities" with U.S. application Ser. No. 11/731,458.

The present application contains subject matter that may be related to the subject matter in the following U.S. applications filed on Apr. 24, 2007, and assigned to the assignee of the present application: "Method and System for Virtualization of Packet Encryption Offload and Onload" with U.S. application Ser. No. 11/789,337 and "Method and System for Combined Security Protocol and Packet Filter Offload and Onload" with U.S. application Ser. No. 11/789,337.

BACKGROUND

Network traffic is transmitted over a network, such as the Internet, from a host (e.g., a device capable of receiving data over a network) to another host. Each host uses a specialized piece of hardware commonly referred to as a network interface card (NIC) to access the network. The NIC is a piece of hardware found in a typical computer system that includes functionality to send and receive network traffic. Typically, network traffic is transmitted in the form of packets, where each packet includes a header and a payload. The header includes information regarding the source address, destination address, size, transport protocol used to transmit the packet, and various other identification information associated with the packet of data. The payload includes the actual data to be transmitted from the network to the receiving system. The contents and transmission of the aforementioned packets on the network are typically governed by Transmission Control Protocol (TCP) and Internet Protocol (IP).

Processing network traffic requires significant host resources. To decrease the amount of processing required by the host, specialized hardware has been developed to process packets. The specialized hardware is external to the processor, which initially processes the packet, and typically only supports single threaded processing (i.e., packets are typically not processed in parallel). The specialized hardware typically includes functionality to obtain packets from the processor, perform specific functions on the packet (e.g., calculate checksum, decrypt packet, encrypt packet, and perform processing required by TCP or IP, etc.), and return the processed packets to the processor. In order to use the specialized hardware, two or more additional I/O operations are typically required in order to transfer packets to the specialized hardware and received the processed packets from the specialized hardware.

SUMMARY

In general, embodiments of the invention relate to a method for processing packets. The method includes receiving a first packet by a network interface card (NIC) operatively connected to a host, classifying the first packet using a classifier, sending the first packet to a first one of a plurality of receive rings based on a classification of the first packet by the classifier, sending the first packet from the first one of the plurality of receive rings to a first virtual network interface card (VNIC), wherein the first VNIC is located on the host, determining, using a first policy associated with the first VNIC, whether to process the first packet using offload hardware, when the first packet is to be processed using the offload hardware, sending the first packet to the offload hardware and receiving a first processed packet from the offload hardware by the first VNIC, when the first packet is not to be processed using the offload hardware, processing the first packet using at least one onload resource to obtain the first processed packet, and sending the first processed packet from the first VNIC to a first packet destination associated with the first VNIC.

In general, embodiments of the invention relate to a method for processing packets. The method includes receiving a packet by a network interface card (NIC) operatively connected to a host, classifying the packet using a classifier, sending the packet to one of a plurality of receive rings based on a classification of the packet by the classifier, sending the packet from the one of the plurality of receive rings to a virtual network interface card (VNIC), wherein the VNIC is located on the host, sending the packet to onload resources bound to the VNIC, processing the packet using the onload resources to obtain the processed packet, and sending the processed packet from the VNIC to a packet destination associated with the VNIC.

In general, embodiments of the invention relate to a system. The system includes offload hardware, at least onload resource, and a network interface card (NIC). The NIC includes a first plurality of receive rings and a hardware classifier and wherein the NIC is configured to: receive a first packet, classify the first packet using the hardware classifier, and send the first packet to a first one of a plurality of receive rings based on a classification of the first packet. The host is operatively connected to the NIC and the offload hardware, and includes a first virtual network interface card (VNIC). The first VNIC is configured to: receive the second packet from the second one of the plurality of receive rings, determine, using a first policy associated with the first VNIC, whether to process the first packet using the offload hardware, send the first packet to the offload hardware, when the first packet is to be processed using the offload hardware and receive a first processed packet from the offload hardware, send the first packet to the at least one onload resource, when the first packet is not to be processed using the offload hardware and receive the first processed packet from the onload resource, and send the first processed packet from the first VNIC to a first packet destination associated with the first VNIC.

Other aspects of the invention will be apparent from the following description and the appended claims.

DETAILED DESCRIPTION

Figure 1:
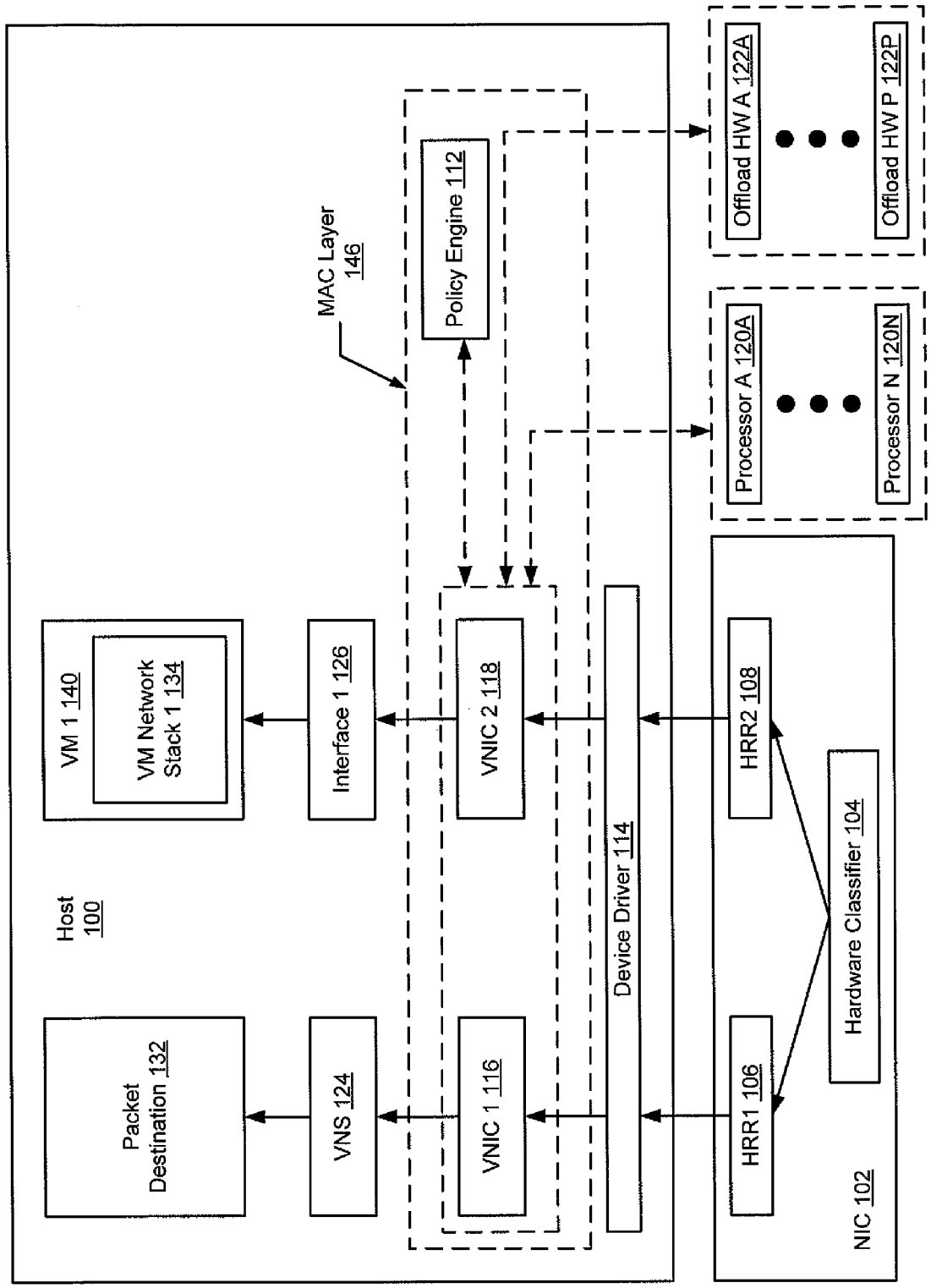
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for onloading network services. More specifically, embodiments of the invention provide a method and system for binding onload resources and offload hardware on a per-VNIC basis and then using a policy engine to determine when to use the onload resources and when to use the offload hardware to process packets received by the VNIC.

FIG. 1 shows a system in accordance with one embodiment of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes a network interface (NI) (i.e. the hardware on the NIC used to interface with the network) (not shown). For example, the NI may correspond to an RJ-45 connector, a wireless antenna, etc. The packets received by the NI are then sent to other components on the NIC (102) for processing. In one embodiment of the invention, the NIC (102) includes a hardware classifier (104) and one or more hardware receive rings (HRRs) (106, 108). In one embodiment of the invention, the HRRs (106, 108) correspond to portions of memory within the NIC (102) used to temporarily store the received packets.

In one embodiment of the invention, the hardware classifier (104) is configured to analyze the incoming network traffic, typically in the form of packets, received from the network (not shown). In one embodiment of the invention, analyzing individual packets includes determining to which of the HRRs (106, 108) each packet is sent. In one embodiment of the invention, analyzing the packets by the hardware classifier (104) includes analyzing one or more fields in each of the packets to determine to which of the HRRs (106, 108) the packets are sent. As an alternative, the hardware classifier (104) may use the contents of one or more fields in each packet as an index into a data structure that includes information necessary to determine to which HRR (106, 108) that packet is sent.

The hardware classifier (104) may be implemented entirely in hardware (i.e., the hardware classifier (104) may be a separate microprocessor embedded on the NIC (102)). Alternatively, the hardware classifier (104) may be implemented in software stored in memory (e.g., firmware, etc.) on the NIC (102) and executed by a microprocessor on the NIC (102).

In one embodiment of the invention, the host (100) may include the following components: a device driver (114), one or more virtual network interface cards (VNICs) (116, 118), one or more virtual network stacks (VNSs) (124), one or more packet destinations (132), one or more interfaces (126), one or more virtual machines (140), and a policy engine (112). Each of the aforementioned components is described below.

In one embodiment of the invention, the device driver (114) provides an interface between the HRRs (106, 108) and the host (100). More specifically, the device driver (114) exposes the HRRs (106, 108) to the host (100) such that the host (100) (or, more specifically, a process executing on the host) may obtain packets from the HRRs (106, 108).

Though not shown in FIG. 1, in one embodiment of the invention, the host may include a software ring. Further, the software ring may include a software classifier and a number of software receive rings (SRR). In one embodiment of the invention, the software classifier has the same functionality as the hardware classifier (104). However, instead of sending the classified packets to a HRR (106, 108), the software classifier forwards classified packets to one of the SRRs. The SRRs are configured to temporarily store the received packets after being classified by the software classifier. In one embodiment of the invention, the software ring (152) resides in a Media Access Control (MAC) layer (146) of the host (100). U.S. patent application entitled "Host Operating System Bypass for Packets Destined for a Virtual Machine" with U.S. application Ser. No. 11/489,943 describes a software ring. U.S. application Ser. No. 11/489,943 is incorporated by reference in its entirety.

Continuing with the discussion of FIG. 1, in one embodiment of the invention, each of the VNICs (116, 118) is associated with either a SRR (not shown) or a HRR (106, 108). The VNICs (116, 118) provide an abstraction layer between the NIC (102) and the various packet destinations (132) or virtual machines (140) executing on the host (100). More specifically, each VNIC (116, 118) operates like a NIC (102). For example, in one embodiment of the invention, each VNIC (116, 118) is associated with one or more Internet Protocol (IP) addresses, one or more Media Access Control (MAC) addresses, optionally, one or more ports, and, is optionally configured to handle one or more protocol types. Thus, while the host (100) may be operatively connected to a single NIC (102), packet destinations (132) and virtual machines (140) executing on the host (100) operate as if the host (100) is bound to multiple NICs. In one embodiment of the invention, the VNICs (116, 118) reside in a Media Access Control (MAC) layer of the host (100).

Each of the VNICs (116, 118) may be operatively connected to a corresponding VNS (124). In one embodiment of the invention, each VNS (124) includes functionality to process packets in accordance with various protocols used to send and receive packets (e.g., Transmission Communication Protocol (TCP), Internet Protocol (IP), User Datagram Protocol (UDP), etc.). Further, each VNS (124) may also include functionality, as needed, to perform additional processing on the incoming and outgoing packets. This additional processing may include, but is not limited to, cryptographic processing, firewall routing, etc.

In one embodiment of the invention, each VNS (124) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.). The structure and functionality of the VNSs (124) is discussed in FIG. 2.

As discussed above, the host (100) includes one or more packet destinations (132). In one embodiment of the invention, the packet destination(s) (132) corresponds to any process (or group of processes) executing on the host that is configured to send and/or receive network traffic. Further, the packet destination(s) (132) does not include an internal network stack (i.e., there is no network stack within the packet destination); rather, the packet destination (132) is associated with a VNS (124).

Examples of packet destinations (132) include, but are not limited to containers and services (e.g., web server) executing on the host (100). As shown in FIG. 1, the VNS (124) is associated with a packet destination (132). In one embodiment of the invention, each packet destination is associated with a single VNS (124). Alternatively, each packet destination is associated with one or more VNSs (124).

In one embodiment of the invention, each VNS (124) is associated with a bandwidth allocation. Those skilled in the art will appreciate that if there is only one VNS (124) bound to the packet destination (132), then the bandwidth allocation of the VNS (124) corresponds to the bandwidth allocated to the packet destination (132). In one embodiment of the invention, the bandwidth allocation corresponds to the number of packets the packet destination may receive in a given time interval (e.g., megabytes per seconds). The bandwidth allocation for a given packet destination is enforced by the VNS operating in polling mode (discussed in FIG. 5).

In one embodiment of the invention, the VNIC (116, 118) may be bound to a virtual machine (140, 142, 144) (e.g., Xen Domain) instead of a packet destination (124). In such cases, the VNIC is bound to an interface (126) (e.g., a Xen interface), where the interface enables the VNIC to communicate to with the virtual machine. In one embodiment of the invention, each of the aforementioned virtual machines includes its own network stack (e.g., 134) and includes its own operating system (OS) instance, which may be different than the OS executing on the host. In one embodiment of the invention, each virtual machine (140) is associated with its own MAC address and IP address (which may be static or obtained using Dynamic Host Configuration Protocol (DHCP)). Further, the VNIC associated with the virtual machine (e.g., VNIC 2 (118) is associated with VM 1 (140) in FIG. 1) includes the same MAC address and IP address as virtual machine with which it is associated.

In one embodiment of the invention, the host (100) is operatively connected to one or more processors (e.g., processor A (120A, processor N (120N)) and offload hardware (122A, 122P). The processors (120A, 120N) may be configured to process multithreads in parallel. In one embodiment of the invention, the multi-threading functionality is provided by a Chip Multi Threading (CMT) architecture. Further, one or more processors (120A, 120N) may be organized into processor groups.

In one embodiment of the invention, onload resources correspond to general purpose processors (120A, 120N) operatively connected to the host (100). Further, onload resources may include memory or on-chip hardware associated with the aforementioned processors (e.g., on-chip cache, etc.). In addition, the onload resources may include software for performing specialized functions using the aforementioned processors. Examples of the functions include, but are not limited to, encrypting and decrypting packets (or portions thereof) or performing other specialized mathematical functions (e.g., calculating checksums, compression, etc.), parsing eXtensible Mark-up Language (XML), packet processing in accordance with TCP, and caching data received over the network (e.g., network layer 7 caching). The software may be configured to utilize the multi-threading functionality provided by the aforementioned processors.

In one embodiment of the invention, the offload hardware (122A, 122P) correspond specialized hardware that is distinct from the processors (120A, 120N). The offload hardware (122A, 122P) may be accessed via corresponding device drivers (not shown) executing on the host (100). Examples of offload hardware (122A, 122P) include, but are not limited to, cryptographic accelerators for encrypting and decrypting packets (or portions thereof) or performing other specialized mathematical functions (e.g., calculating checksums, compression, etc.), eXtensible Mark-up Language (XML) parsers, specialized offload hardware to supporting packet processing in accordance with TCP (e.g., TCP offload engines), and specialized hardware for caching data received over the network. In one embodiment of the invention, each VNIC (116, 118) may be associated with specific offload hardware (122A, 122P) and specific onload resources.

In one embodiment of the invention, the policy engine (112) is configured to store one or more policies. Further, the policy engine (112) is configured to enforce the policies stored within the policy engine (112). In another embodiment of the invention, the policies are stored in a location accessible by the policy engine (as opposed to within the policy engine).

In one embodiment of the invention, each policy specifies how to process packets received by one or more VNICs. More specifically, the policy specifics whether a given packet received by a VNIC should be processed using onload resources associated with the VNIC or offload resources associated with the VNIC. For example, the policy may specify that the VNIC should always use offload hardware to process packets that require cryptographic processing (e.g., encryption or decryption). The same policy may also specify that processing packets pursuant to TCP should be performed using the offload hardware if the offload hardware is available and should be performed using the onload resources when the offload hardware is not available (e.g., because the offload hardware is currently in use or the offload hardware has failed). In one embodiment of the invention, the policy engine (112) may include a global policy that is used by all VNICs. Alternatively, each VNIC (or a subset of VNICs) may be associated with a policy.

Figure 2:
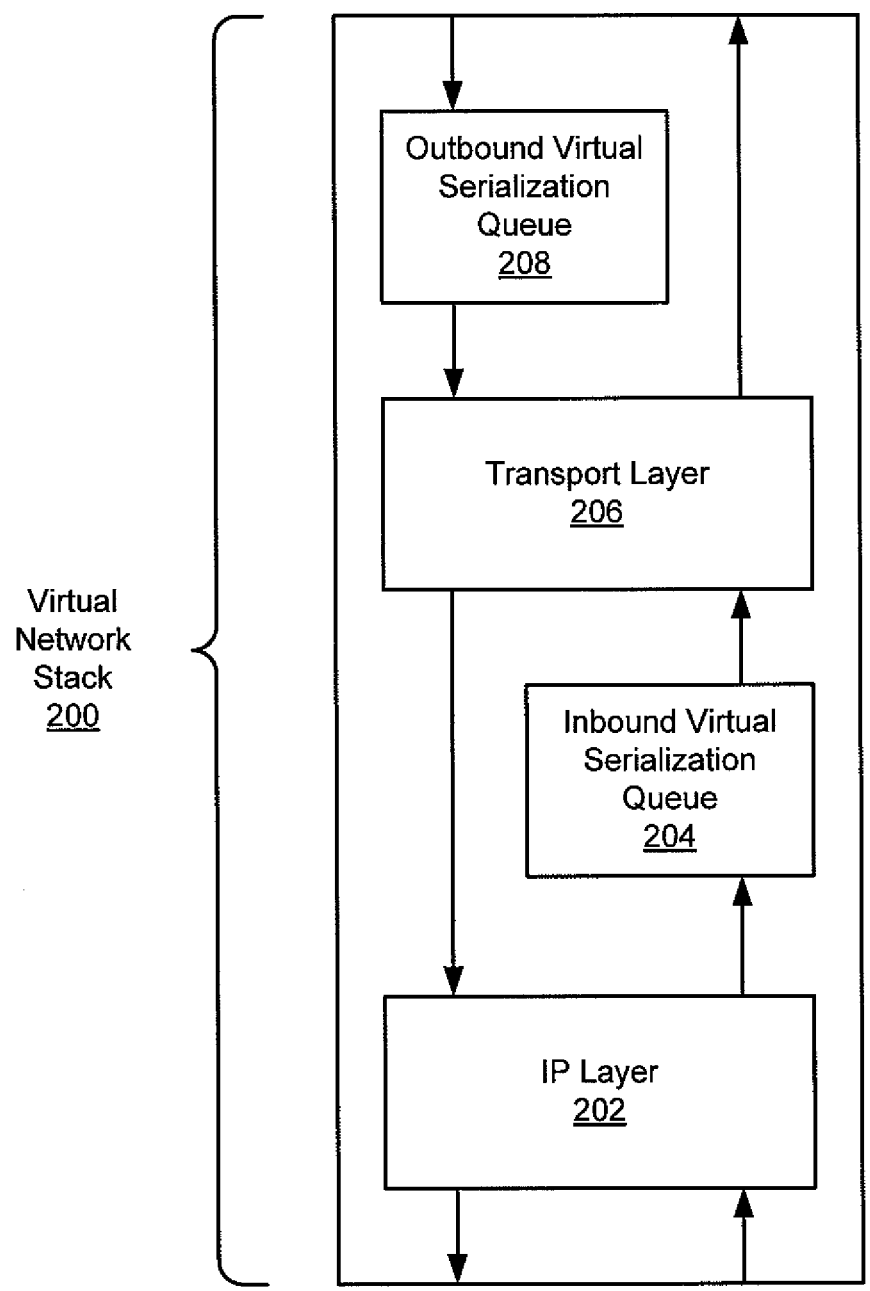
FIG. 2 shows a virtual network stack in accordance with one embodiment of the invention.

FIG. 2 shows a virtual network stack (VNS) in accordance with one embodiment of the invention. In one embodiment of the invention, the VNS (200) includes an Internet Protocol (IP) layer (202), an inbound virtual serialization queue (VSQ) (204), a transport layer (206), and an outbound serialization queue (208). Each of the aforementioned components is discussed below.

In one embodiment, the IP layer (202) is configured to receive packets from the VNIC associated with the VNS (204) (e.g., VNS (124) receives packets from VNIC 1 (116) in FIG. 1). Further, the IP layer (202) is configured to receive packets from the transport layer (206). In one embodiment of the invention, the IP layer (202) is configured to perform IP level processing for both inbound and outbound packets.

Continuing with the discussion of FIG. 2, the inbound VSQ (204) is configured to receive packets from the IP layer (202). The inbound VSQ (204) corresponds to a queue data structure and is configured to queue packets received from the IP layer (202) prior to the packets being processed by the transport layer (206). In one embodiment of the invention, the inbound VSQ (204) may be used to control the number of packets being received by the packet destination (e.g., 132) associated with VNS. The inbound VSQ (204) may control the bandwidth by limiting the number of packets in the VSQ (204) and preventing additional packets from entering the VNS (200) until the inbound VSQ (204) has less than a threshold number of packets.

In one embodiment of the invention, the transport layer (206) is configured to process inbound and outbound packets in accordance with Transmission Control Protocol (TCP), User Datagram Protocol (UDP), or both UDP and TCP. Other protocols may be supported by the transport layer (206).

In one embodiment of the invention, the outbound VSQ (208) is a queue data structure configured to receive packets from the packet destination (e.g., 132) with which the VNS (204) is associated. Further, the outbound VSQ (208) is configured to store packets prior to sending the received packets to the transport layer (206). In one embodiment of the invention, the outbound VSQ (208) is also configured to control the flow of packets from the packet destination (e.g., 132) associated with the VNS (204) to the VNS (200). In one embodiment of the invention, the outbound VSQ (208) (or a related process) is configured to block an application for sending packets to the outbound VSQ (208), if the packet destination (e.g., 132) is attempting to issue packets at a higher rate than the outbound bandwidth allocated to the packet destination (e.g., 132). Further, the outbound VSQ (208) (or a related process) is configured to notify the packet destination (e.g., 132) when it is no longer blocked from issuing packets to the VNS (200).

In one embodiment of the invention, the inbound VSQ (204) and outbound VSQ (208) are each configured to enforce the manner in which packets are processed. Specifically, the inbound VSQ (204) and outbound VSQ (208) may be configured to enforce the resource requirements imposed by the transport layer (206). For example, TCP requires serial processing of packets. Thus, the inbound VSQ (204) and outbound VSQ (208) may require all threads accessing the inbound VSQ (204) and outbound VSQ (208) to conform to a mutual exclusion policy. In one embodiment of the invention, the mutual exclusion policy requires that only one thread may access the VSQ (inbound or outbound) at a time. Thus, if two threads are attempting to access a given VSQ (inbound or outbound), one thread must wait until the other thread has finished accessing the VSQ (inbound or outbound).

Alternatively, if the transport layer (206) only supports UDP, then the inbound VSQ (204) and outbound VSQ (208) may be configured to allow concurrent access. Said another way, two or more threads may concurrently access the VSQ (inbound or outbound). In one embodiment of the invention, if the transport layer (206) is configured to process both TCP and UDP packets, then the inbound VSQ (204) and outbound VSQ (208) are configured to conform to the more stringent standard (e.g., TCP if the transport layer supports both TCP and UDP).

In one embodiment of the invention, the inbound VSQ (204) and the outbound VSQ (208) are implemented as a single bi-directional VSQ. In such cases, the bi-directional VSQ includes a single set of configuration parameters (discussed above) to enforce the manner in which packets are processed. Further, the enforcement of the configuration parameters is performed on a VSQ-basis (as opposed to a per-direction basis). For example, if the bi-directional VSQ enforces a mutual exclusion policy, then only one thread may access the bi-directional VSQ at a time.

Figure 3:
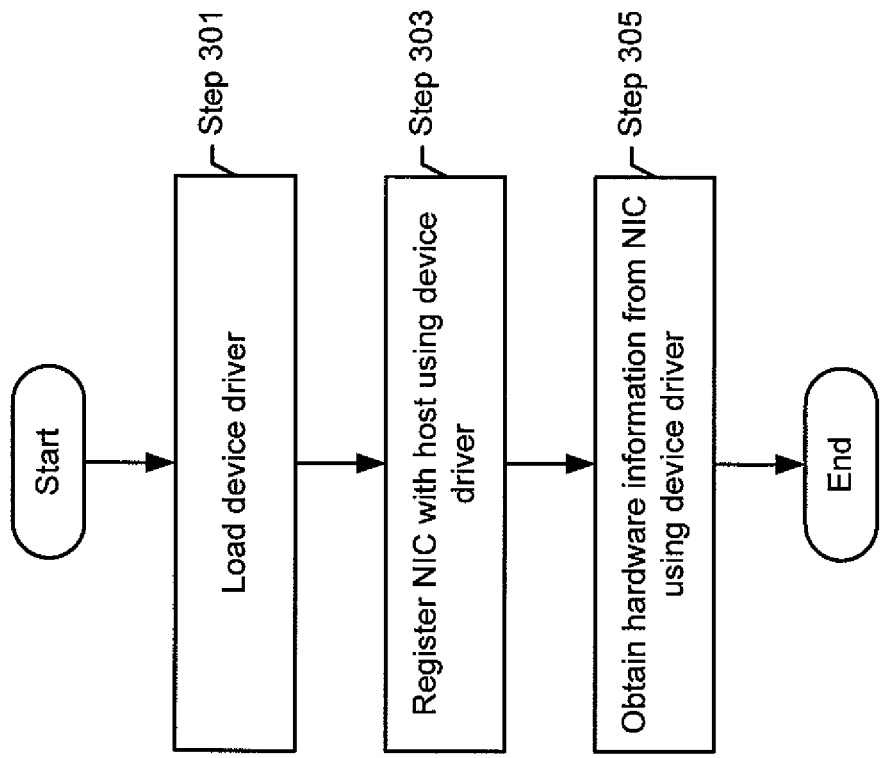
FIGS. 3-5 show flow charts in accordance with one embodiment of the invention.
Figure 4:
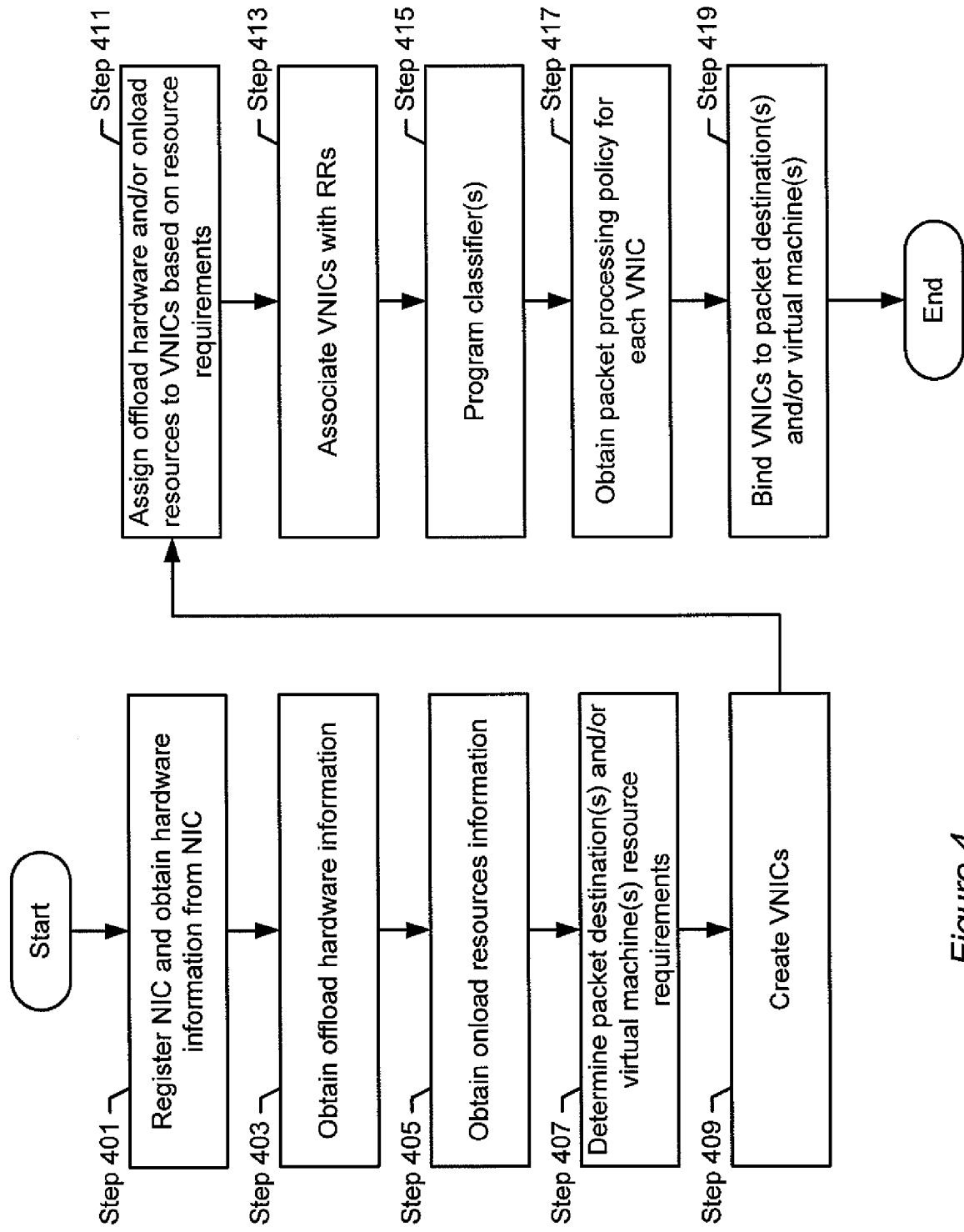
Figure 5:
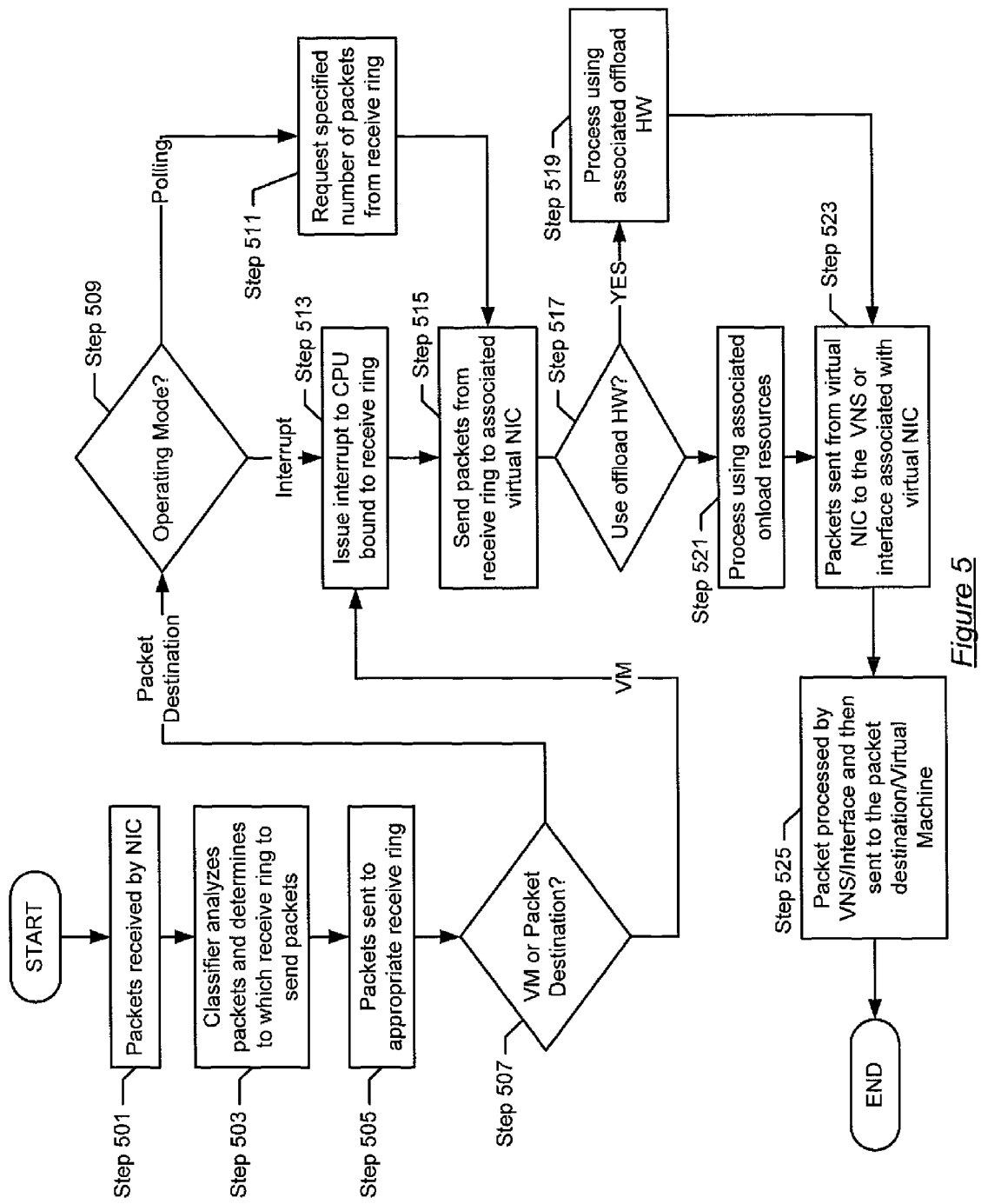

FIGS. 3-5 show flowcharts of methods in accordance with one or more embodiments of the invention. While the various steps in the flowcharts are presented and described sequentially, one of ordinary skill will appreciate that some or all of the steps may be executed in different orders and some or all of the steps may be executed in parallel.

FIG. 3 shows a flow chart in accordance with one embodiment of the invention. More specifically, FIG. 3 shows a method for registering the NIC with the host in accordance with one embodiment of the invention. In Step 301, a device driver is loaded onto the host. In one embodiment of the invention, the device driver is specific to the NIC. Further, the device driver includes functionality to expose the NIC to the host. Exposing the NIC to the host includes, but is not limited to, obtaining hardware information from the NIC. In one embodiment of the invention, the device driver is interposed between the NIC and MAC layer of the host.

Continuing with the discussion of FIG. 3, in Step 303, the device driver subsequently discovers the NIC and registers it with the host. Registering the NIC with the host may include, but is not limited to, notifying the host that the NIC is operatively connected to the host and that the host (or processes executing on the host) may use the NIC to send and receive packets. At this stage, the host is aware that the NIC is operatively connected to the host but, typically, does not have sufficient information about the various hardware resources within the NIC (i.e., hardware classifier in the NIC) or sufficient information to program the NIC.

In Step 305, the device driver subsequently obtains hardware information from the NIC. In one embodiment of the invention, hardware information corresponds to information about the hardware resources on the NIC. The hardware resources may include, but are not limited to, hardware receive rings (HRRs) (e.g., 106 in FIG. 1), transmit receive rings (TRRs) (not shown in FIG. 1), and a hardware classifier (e.g., 104 in FIG. 1). The TRRs correspond to outbound queues (typically First-In-First-Out (FIFO) queues) in the NIC used to handle outbound packets (i.e., packets received from the host and destined for another host on the network). In one embodiment of the invention, the device driver may obtain a listing of all HRRs and TRRs available on the NIC.

FIG. 4 shows a flow chart in accordance with one or more embodiments of the invention. More specifically, FIG. 4 shows a method for setting up VNICs in accordance with one embodiment of the invention. In Step 401, the NIC is registered and the appropriate device driver is used to obtain hardware information about the network interface card (NIC). Step 401 typically includes performing the steps in FIG. 3. In Step 403, offload hardware information is obtained. In one embodiment of the invention, the offload hardware information includes information about what offload hardware is available to the host as well as the capabilities of the offload hardware (i.e., the functionality of the offload hardware).

In Step 405, onload resource information is obtained. In one embodiment of the invention, the onload resource information may include, but is not limited to, the number of processors available to the host, whether chip multithreading is supported, whether processors groups have been established, whether the host support processor groups, caching capabilities of the processors and/or host (e.g., is network layer 7 caching supported), and information about specialized functions the software supports.

In Step 407, packet destination and/or VM resource requirements are obtained. In one embodiment of the invention, the resource requirements may include, but are not limited to, a number of threads required by the packet destination or VM, a specialized mathematical function to be applied to packets destined for the packet destination or VM, and a performance requirement (e.g., latency between sending request for packets and receiving packets).

In Step 409, VNICs are created on the host. In Step 411, onload resources and/or offload resources are assigned to the VNICs based on the resource requirements obtained in Step 407. For example, if the resource requirements for a packet destination specify a performance requirement and the packet destination is implementing IPSec, the VNIC associated with the packet destination may be associated with onload resources that support to network layer 7 caching and offload hardware that supports cryptographic acceleration. Further, the packet destination may also be associated with onload resources that support cryptographic processing, which may be used in the event the offload hardware is unavailable or fails.

In another example, the resource requirements for a packet destination indicate that the packet destination (or a process executing therein) requires multiple threads, where each thread is associated with a separate kernel-level remote procedure call (RPC) (e.g., RPC calls issued by the Network File System daemon (NFSd)). In such cases, the packet destination is associated with onload resources that support chip multi-threading, where the magnitude of the onload resources associated with the packet destination are sufficient to support the chip multi-threading (and other processing power) required by the packet destination.

Continuing with the discussion of FIG. 4, in Step 413 the VNICs are associated with the RRs (HRR or SRR). In Step 415, the hardware classifier (in the NIC) and the software classifier (if host includes a software ring) are programmed. In one embodiment of the invention, programming the hardware classifier and software classifier includes specifying to which HRR or SRR to send the received packets. The hardware classifier may be programmed using an API advertised by the device driver (see FIG. 3 above).

In one embodiment of the invention, programming the hardware classifier includes specifying that all packets for a specific packet destination or virtual machine are sent to a specific HRR. In one embodiment of the invention, the hardware classifier is programmed using the MAC address and, optionally, the IP address associated with the virtual machines. Thus, all packets with a specific MAC address (and optionally an IP address) are sent to a specific HRR. As discussed, the HRRs are bound to VNICs or software rings. Thus, packets sent to specific HRRs are subsequently sent to the appropriate VNIC or software ring.

In the case where the packets are sent to the software ring, the software classifier in the software ring performs additional classification. In one embodiment of the invention, the software classifier includes the same functionality as the hardware classifier and is programmed using the same criteria (e.g., MAC addresses, IP addresses, etc.) as the hardware classifier.

In one embodiment of the invention, VNICs are preferably bound to an HRR if an HRR is available and the hardware classifier in the NIC is configured to perform the level of classification required by the host. In such cases, one HRR is bound to a software ring and the other HRRs are bound to VNICs. In one embodiment of the invention, each of the aforementioned VNICs is associated with a virtual network stack (VNS). Further, each VNS is associated with a bandwidth allocation.

As stated above, software rings can be arbitrarily created on top of HRR or SRRs. As a result, different structures involving software rings can be created to handle the same number of VNICs using the method shown in FIG. 4.

Continuing with the discussion of FIG. 4, in Step 417 the policy (or policies) for the VNICs is obtained. As discussed above, the policies specify how the VNIC is the process packets using the onload resources and/or offload hardware associated with the VNIC. In Step 419, the VNICs are bound to the packet destinations and/or VMs.

FIG. 5 shows a flow chart in accordance with one or more embodiments of the invention. More specifically, FIG. 5 describes a method for using a host configured using the methods described in FIGS. 3 and 4 in accordance with one embodiment of the invention. In Step 501, a packet is received by a NIC. In Step 503, a hardware classifier associated with the NIC determines to which receive ring (e.g., HRR) on the NIC to send the packets. The packets are then sent to the appropriate HRR (Step 505) based on the classification.

In Step 507, a determination is made about whether the receive ring is associated with a virtual machine or a packet destination. The HRR is associated with the virtual machine if the HRR sends (via a VNIC) received packets to an interface, which in turn sends packets to a virtual machine. Similarly, the HRR is associated with a packet destination if the HRR (via a VNIC) sends packets to a VNS, which in turn sends packets to a packet destination.

If the HRR is associated with a packet destination, the process proceeds to Step 509. Alternatively, if the HRR is associated with a virtual machine, then the process proceeds to Step 513. With respect to Step 509, a determination is made about whether the VSQ associated with the VNS is operating in polling mode or interrupt mode.

If the VSQ is operating in polling mode, then the packets remain in the HRR until the VSQ requests a specified number of packets from the HRR (Step 511). In one embodiment of the invention, the VSQ does not request any packets when there are packets already queued on the VSQ. In one or more embodiments of the invention, the VSQ retrieves all packets from the HRR when a request is made for packets.

Those skilled in the art will appreciate that the HRRs store a finite number of packets. Thus, if the HRRs receive packets at a faster rate than the rate at which the corresponding VSQ requests the packets, the HRRs will eventually fill completely with packets and packets received after this point are dropped until packets on the HRks are requested and processed. In one embodiment of the invention, the rate at which packets are requested from the HRR and the number of packets requested is determined by the bandwidth allocation of the VNS bound to the HRR. In one embodiment of the invention, a function entry point associated with the HRR is used to poll the specific HRR.

Alternatively, if the VSQ is operating in interrupt mode or the VNIC is associated with a virtual machine, then an interrupt is issued to a processor (i.e., a processor bound to the VSQ that is bound to the VNS associated with the HRR or to a processor bound to a virtual machine) (Step 513). The packets are then sent to the VNIC (Step 515). In one embodiment of the invention, if the VSQ is operating polling mode, then the VSQ, which includes the function entry point, uses the function entry point to obtain the packet from the HRR and place it in the appropriate VNIC. Alternatively, if the VSQ is operating in interrupt mode, then the device driver (or NIC) executes the function entry point to send the packet from the HRR to the appropriate VNIC.

In Step 517, a determination is made about whether the packet should be processed using offload hardware. In one embodiment of the invention, this determination is made by the policy engine using the policy associated with the VNIC (i.e., the VNIC to which the packet was sent in Step 515). In addition, the policy engine may also take into account the availability of the offload hardware when determining whether to use the offload hardware. If the packet is to be processed using offload hardware, the packet is processed by the offload hardware (Step 519). Processing the packet by the offload hardware includes issuing the necessary requests to the offload hardware (including performing the necessary I/O commands) and receiving the processed packet from the offload hardware. In one embodiment of the invention, the offload hardware provides the processed packet to the VNIC.

Alternatively, if the packet is to be processed using onload resources, the packet is processed by the onload resources (Step 521). Step 521 may include invoking various specialized software routines to perform the necessary processing. Further, Step 521 may include utilizing specialized on-chip hardware and chip multi-threading functionality.

In Step 523, the processed packet (received from Step 519 or Step 521) is sent to the appropriate VNS or Interface, where the packets are processed and then sent to the packet destination or virtual machine (Step 525). In one embodiment of the invention, processing the packet by the interface includes flipping the content of the packet such that the most significant bit becomes the least significant bit. Once the packet has been processed by the interface, it is placed in the address space associated with the virtual machine. In one embodiment of the invention, processing the packet by the VNS is described in FIG. 2.

In one embodiment of the invention, the method described in FIG. 5 may be extended to take into account SRRs. In such cases, the VNICs associated with the SRRs perform the same functions as the VNICs associated with HRRs as described above.

Figure 6:
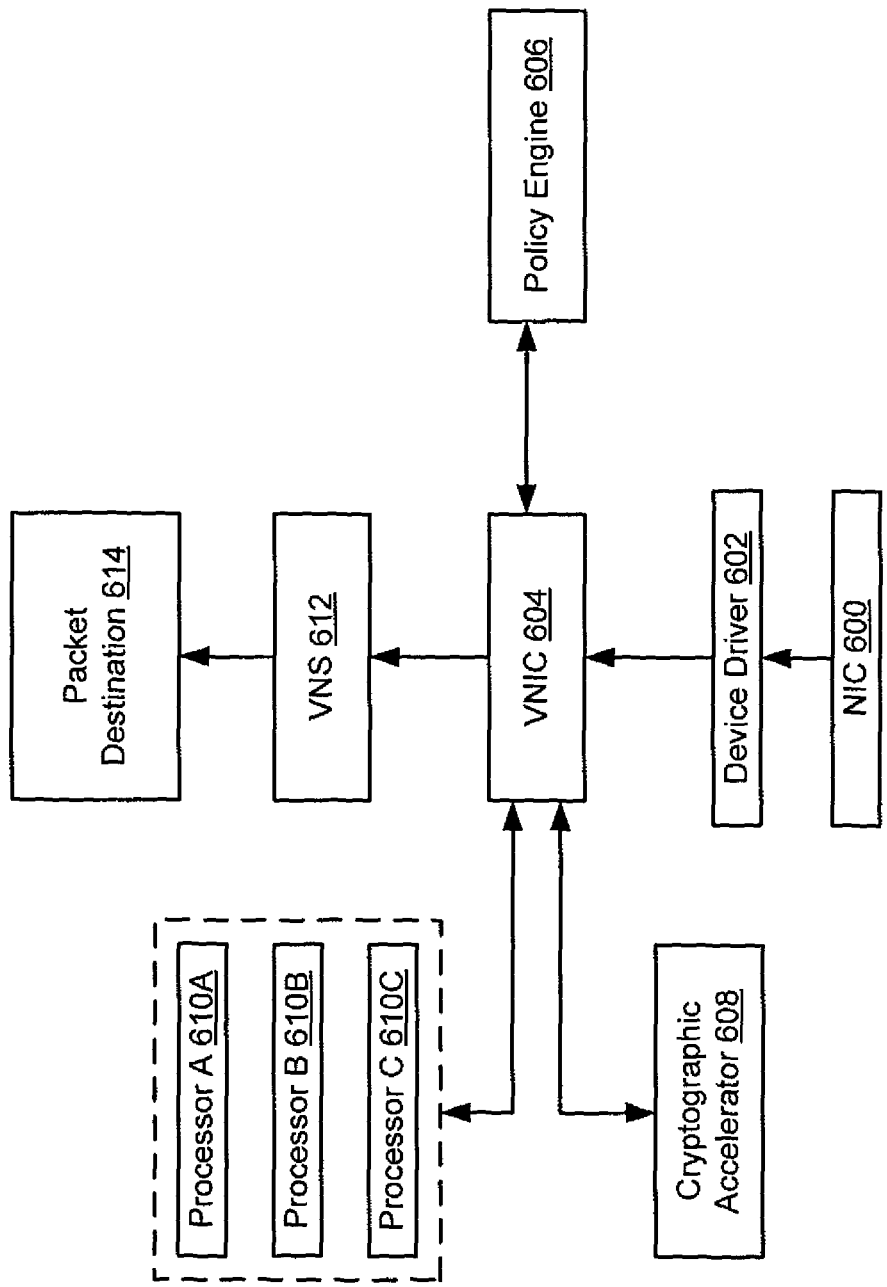
FIG. 6 shows an example in accordance with one embodiment of the invention.

FIG. 6 shows an example in accordance with one embodiment of the invention. The example is not intended to limit the scope of the invention. Those skilled in the art will appreciate that various components of the host system shown in FIG. 1 are omitted in FIG. 6 for simplicity.

Turning to FIG. 6, the system includes a NIC (600) associated with a device driver (602). The device driver (602) provides an interface between the NIC (600) and the VNIC (604). The VNIC (604) is bound to three processors (610A, 610B, 610C) (i.e., an onload resource) and a cryptographic accelerator (608) (i.e., offload hardware). Further, the VNIC (604) is associated with a policy engine (606). The policy engine (606) implements a policy for the VNIC (604), where the policy specifies when packets received by the VNIC (604) are processed using the processors (610A, 610B, 610C) and when packets received by the VNIC (604) are processed using the cryptographic accelerator (608). Processed packets from the VNIC (604) are sent to the VNS (612) bound to the VNIC (604). The VNS (612) further processes the packets and then sends them to the packet destination (614).

Using the system shown in FIG. 6, consider the following scenario, the NIC (600) is receiving encrypted packets for the packet destination (614) at a high rate. The policy associated with VNIC (604) indicates that the cryptographic accelerator (608) should be used if it is available. However, if the cryptographic accelerator (508) is not available, then the onload resources (i.e., processors (610A, 610B, 610C)) should be used. In this case, the cryptographic accelerator (608) only supports single threading and, thus, is the bottleneck for processing the encrypted packets. Accordingly, the policy engine (606) leverages the onload resources to process the encrypted packets concurrently with the cryptographic accelerator (608). While the onload resources may not operate at the same speed as the cryptographic accelerator (608), the larger number of general purpose processors (i.e., processors (610A, 610B, 610C)) allows for an overall higher throughput of processed packets. Further, the system shown in FIG. 6 can leverage both the offload hardware and offload resources simultaneously to maximize throughput of processed packets.

Figure 7:
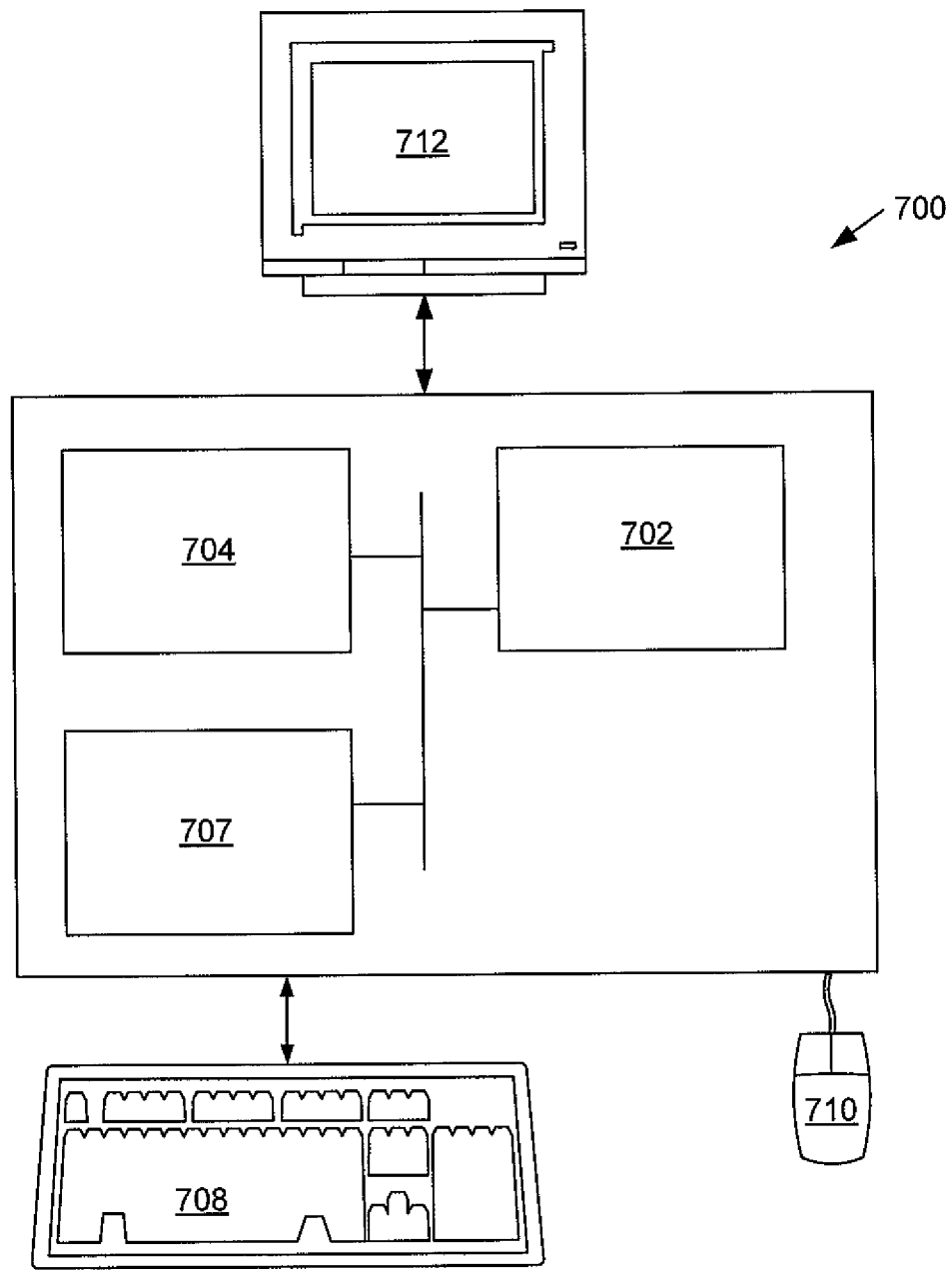
FIG. 7 shows a computer in accordance with one embodiment of the invention.

An embodiment of the invention may be implemented on virtually any type of computer regardless of the platform being used. For example, as shown in FIG. 7, a networked computer system (700) includes a processor (702), associated memory (704), a storage device (706), and numerous other elements and functionalities typical of today's computers (not shown). The networked computer (700) may also include input means, such as a keyboard (708) and a mouse (710), and output means, such as a monitor (712). The networked computer system (700) is connected to a local area network (LAN) or a wide area network via a network interface connection (not shown). Those skilled in the art will appreciate that these input and output means may take other forms. Further, those skilled in the art will appreciate that one or more elements of the aforementioned computer (700) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets, comprising:
receiving a first packet by a network interface card (NIC) operatively connected to a host;
classifying the first packet using a classifier;
sending the first packet to a first one of a plurality of receive rings based on a classification of the first packet by the classifier;
sending the first packet from the first one of the plurality of receive rings to a first virtual network interface card (VNIC), wherein the first VNIC is located on the host;
determining, by a policy engine using a first policy associated with the first VNIC, whether to process the first packet using offload hardware, wherein the offload hardware comprises at least a cryptographic accelerator, and wherein the first VNIC is configured to communicate directly with the policy engine, and wherein the first VNIC and the policy engine are located in a Media Access Control (MAC) layer of the host;
when the first packet is to be processed using the offload hardware, sending the first packet to the offload hardware and receiving a first processed packet from the offload hardware by the first VNIC;
when the first packet is not to be processed using the offload hardware, processing the first packet using at least one onload resource to obtain the first processed packet; and
sending the first processed packet from the first VNIC to a first packet destination associated with the first VNIC, wherein the first packet destination is on the host.

2. The method of claim 1, further comprising:
receiving a second packet by the NIC;
classifying the second packet using the classifier;
sending the second packet to a second one of the plurality of receive rings based on the classification of the second packet by the classifier;
sending the second packet from the second one of the plurality of receive rings to a second VNIC, wherein the second VNIC is located on the host;
determining, using a second policy associated with the second VNIC, whether to process the second packet using the offload hardware;
when the second packet is to be processed using the offload hardware, sending the second packet to the offload hardware and receiving a second processed packet from the offload hardware by the second VNIC;
when the first packet is not to be processed using the offload hardware, processing the second packet using the at least one onload resource to obtain the second processed packet; and
sending the second processed packet from the second VNIC to a second packet destination associated with the second VNIC.

3. The method of claim 1, further comprising:
prior to receiving the first packet:
associating the first VNIC with the offload hardware and the at least one onload resource; and
obtaining the first policy which specifies when packets received by the first VNIC are processed using the offload hardware and when the packets received by the first VNIC are processed using the at least one onload resource,
wherein the first policy is enforced by the policy engine.

4. The method of claim 3, further comprising:
determining a resource requirement of the first packet destination;
creating the first VNIC;
binding the first VNIC to the first packet destination; and
binding the first one of the plurality of receive rings to the first VNIC,
wherein associating the first VNIC with the offload hardware and at least one onload resource is based on the resource requirement.

5. The method of claim 4, wherein the resource requirement comprises at least one selected from a group consisting of a number of threads required by the packet destination, a specialized mathematical function to be applied to packets destined from the packet destination, and a performance requirement.

6. The method of claim 3, wherein the first VNIC is associated with a processor which is operatively connected to the offload hardware and wherein the at least one onload resource is associated with the processor.

7. The method of claim 3, wherein the first VNIC is associated with a processor group and wherein the at least one onload resource is associated with the processor group.

8. A system, comprising:
offload hardware;
at least one onload resource;
a network interface card (NIC) comprising:
  a first plurality of receive rings and a hardware classifier,
  wherein the NIC is configured to:
    receive a first packet,
    classify the first packet using the hardware classifier, and
    send the first packet to a first one of a plurality of receive rings based on a classification of the first packet; and
a host, operatively connected to the NIC and the offload hardware, comprising:
  a first virtual network interface card (VNIC);
  a first packet destination; and
  a policy engine, wherein the first VNIC is configured to communicate directly with the policy engine, and wherein the first VNIC and the policy engine are located in a Media Access Control (MAC) layer of the host,
  wherein the first VNIC is configured to:
    receive the first packet from the first one of the plurality of receive rings;
    determine, by a policy engine using a first policy associated with the first VNIC, whether to process the first packet using the offload hardware;
    send the first packet to the offload hardware, when the first packet is to be processed using the offload hardware and receive a first processed packet from the offload hardware, wherein the offload hardware comprises at least a cryptographic accelerator;
    send the first packet to the at least one onload resource, when the first packet is not to be processed using the offload hardware and receive the first processed packet from the onload resource; and
    send the first processed packet from the first VNIC to the first packet destination associated with the first VNIC.

9. The system of claim 8, further comprising:
a second VNIC,
wherein the NIC is configured to:
  receive a second packet,
  classify the second packet using the hardware classifier, and
  send the second packet to a second one of the plurality of receive rings based on a classification of the second packet; and
wherein the second VNIC is configured to:
  receive the second packet from the second one of the plurality of receive rings;
  determine, using a second policy associated with the second VNIC, whether to process the second packet using the offload hardware;
  send the second packet to the offload hardware, when the second packet is to be processed using the offload hardware and receive a second processed packet from the offload hardware;
  send the second packet to the at least one onload resource, when the second packet is not to be processed using the offload hardware and receive the first processed packet from the onload resource; and
  send the second processed packet to a second packet destination associated with the second VNIC.

10. The system of claim 9, wherein the first VNIC is associated with a processor group and wherein the at least one onload resource is associated with the processor group.

11. The system of claim 8, further comprising:
prior to receiving the first packet, the host is configured to:
  associate the first VNIC with the offload hardware and the at least one onload resource; and
  obtain the first policy which specifies when packets received by the first VNIC are processed using the offload hardware and when the packets received by the first VNIC are processed using the at least one onload resource,
  wherein the first policy is enforced by the policy engine.

12. The system of claim 11, wherein the host is further configured to:
determine a resource requirement of the first packet destination;
create the first VNIC;
bind the first VNIC to the first packet destination; and
bind the first one of the plurality of receive rings to the first VNIC,
wherein associating the first VNIC with the offload hardware and at least one onload resource is based on the resource requirement.

13. The system of claim 12, wherein the resource requirement comprises at least one selected from a group consisting of a number of threads required by the packet destination, a specialized mathematical function to be applied to packets destined from the packet destination, and a performance requirement.

* * * * *